(12) United States Patent
Kang et al.

(10) Patent No.: US 6,853,355 B1
(45) Date of Patent: Feb. 8, 2005

(54) SWITCHABLE VIDEO OVERLAY APPARATUS AND METHOD

(75) Inventors: Lili Kang, Don Mills (CA); Jacky Yan, Richmind Hill (CA)

(73) Assignee: ATI International Srl, Christ Church (BB)

( * ) Notice: Subject to any disclaimer, the term of this patent is extended or adjusted under 35 U.S.C. 154(b) by 0 days.

(21) Appl. No.: 09/287,776

(22) Filed: Apr. 7, 1999

(51) Int. Cl.[7] .................... G09G 5/00; G09G 5/36; H04N 5/45
(52) U.S. Cl. .................... 345/2.2; 345/547; 348/565
(58) Field of Search .................... 345/1.1, 2.1, 2.2, 345/3.1–3.3, 545–547, 555, 559, 660, 781, 800, 2, 113, 115, 127, 198, 435; 348/537, 563, 565, 578

(56) References Cited

U.S. PATENT DOCUMENTS

| 5,369,617 | A | * | 11/1994 | Munson ............... 365/219 |
| 5,570,126 | A | * | 10/1996 | Blahut et al. ........... 725/93 |
| 5,644,363 | A | * | 7/1997 | Mead .................. 348/563 |
| 5,673,204 | A | * | 9/1997 | Klingelhofer ........... 348/578 |
| 5,764,201 | A | * | 6/1998 | Ranganathan ........... 345/3.3 |
| 5,874,937 | A | * | 2/1999 | Kesatoshi .............. 345/127 |
| 6,175,387 | B1 | * | 1/2001 | Han ................... 348/565 |
| 6,177,946 | B1 | * | 1/2001 | Sinclair et al. ......... 345/501 |
| 6,184,906 | B1 | * | 2/2001 | Wang et al. ............ 345/532 |

OTHER PUBLICATIONS

Merriam–Webster's Collegiate Dictionary, www.m–w.com, search term: 'video' (adjective).*

* cited by examiner

Primary Examiner—Bipin Shalwala
Assistant Examiner—Jeff Piziali
(74) Attorney, Agent, or Firm—Vedder, Price, Kaufman & Kammholz, P.C.

(57) ABSTRACT

A video overlay switching apparatus and method utilizes a common video scaler that receives input video data. A programmable switching mechanism, such as a register-controlled multiplexer, receives video information from the video scaler, either scaled video or unscaled video, and selectively routes the video data to any one of a plurality of video overlay generators to facilitate selective display of overlay data on a specified display device. The programmable switching mechanism also facilitates programming of frame buffer space for each display engine, based on which video overlay generator has been selected to receive input video.

22 Claims, 3 Drawing Sheets

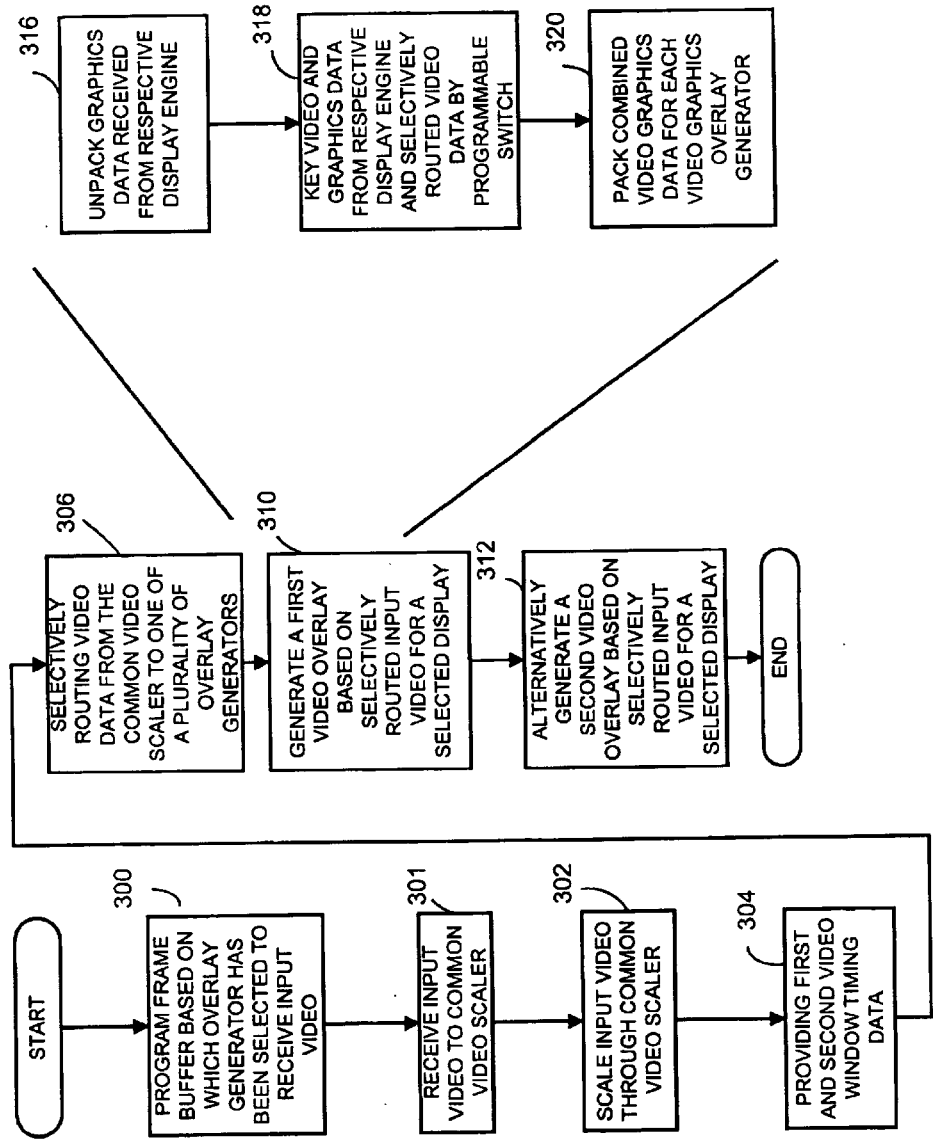

SWITCHABLE VIDEO OVERLAY APPARATUS AND METHOD

FIELD OF THE INVENTION

The invention relates generally to systems and methods that provide video overlay information such as simultaneous display of video and graphics information on a display device, and more particularly, to switchable video overlay systems and methods.

BACKGROUND OF THE INVENTION

Computer systems and other information display systems are increasingly displaying multi-media information. For example, computer systems may be used as presentation systems which may provide the simultaneous display of different data on multiple displays. For example, if a user wishes to use a larger display device, such as a large screen projector, a single computer system may display data that is different than a user's corresponding lap top display device—which may include, for example, notes that are not shown on the large screen projector. However, such systems typically employ separate video engines. For example, where the information to be displayed includes both video information and graphics information, such as where a video game is running and being displayed at the same time that a movie is being displayed within a same display screen, two separate video processing and overlay paths are required. Typically, one path is dedicated to one display engine and another video processing and overlay path is dedicated for another display engine. Each display engine is dedicated to a different display device.

In addition, other systems generally only allow video overlay capability on one of the displays. As such, one of the two display engines does not have the capability to overlay information on a second display. This is typically done to minimize cost and complexity of the system as well as to reduce difficulty in designing a system that can employ video overlay on each of the display devices.

Also, systems that may employ two separate display paths may have two display engines, each with video overlay capability. However, in such systems, the processing paths may each include a separate video scaler. A video scaler, as known in the art, may increase or reduce the size of the video to be displayed within a window, or to be overlaid with graphics (i.e., non-video data) being displayed on the display device. Dual video scalers increase the cost of the system and also introduce a bandwidth problem, since two scalers are typically requesting data from the frame buffer at the same time. This can degrade system performance. Accordingly, systems also may typically provide dual or simultaneous display of overlay information on multiple devices, but typically require the duplicity of video scalers and display engines.

In such a system, one display engine provides video window-timing data, such as video window-timing parameters, which define the size and position of the overlay in the viewing area. The start and ending points of the video window on the screen and other data, known in the art as graphics display data, may be packed by a data packer in the display engine. The other display engine for the other path does not allow for video overlay and thus is without video window-timing information and is simply a graphics data packer and graphics timing provider. As known in the art, a keyer mixes video and graphics data to see which information is overlaid on top of the other information. The output from the keyer is typically the overlaid information, which may be output to a digital to analog converter (DAC) and LCD display engine or other suitable display device. In addition, such systems typically use separate data packers, one dedicated to each display engine, and only one of the packers includes a keyer. The second packer does not provide overlay information, and as such, simply packs the display data in a form that is understood by the DAC.

Consequently, there exists a need for a system that can provide video overlay information on one of any of a plurality of displays so that any display may alternately be used to display video overlay information. It would be desirable if such a system improved bandwidth problems and reduced the number of required video scalers. It would also be desirable if such a system utilized one video resource.

BRIEF DESCRIPTION OF THE DRAWINGS

The features of the present invention will be more readily understood from the following detailed description of examples of embodiments thereof, when read in conjunction with the accompanying drawings.

FIG. 3a is a flow chart illustrating one example of the operation of the system shown in FIGS. 1 and 2.

FIG. 3b is a flow chart illustrating in more detail the step of generating video overlay information, based on selectively routed input video in accordance with one embodiment of the invention.

DETAILED DESCRIPTION OF A PREFERRED EMBODIMENT OF THE INVENTION

Briefly, a video overlay switching apparatus and method utilizes a common video scaler that receives input video data. A programmable switching mechanism, such as a register-controlled multiplexer, receives video information from the video scaler, either scaled video or unscaled video, and selectively routes the video data to any one of a plurality of video overlay generators to facilitate selective display of overlay data on a specified display device. The programmable switching mechanism also facilitates programming of frame buffer space for each display engine, based on which video overlay generator has been selected to receive input video. The programmable switching device, in one embodiment, provides a single video clock signal that varies depending upon the control signal to obtain input video from a line buffer. A single video path is used to switch the video data into one of the plurality of video overlay generators. Each of the video overlay generators provides overlay video information to one of a plurality of display devices. As such, the system employs a plurality of keyers, each dedicated to overlaying selectively routed video from the common video scaler.

In one embodiment, each of a plurality of graphic display engines provides video window-timing data to corresponding video overlay generators to facilitate separate video overlay generation from a common video scaler.

Figure 1:
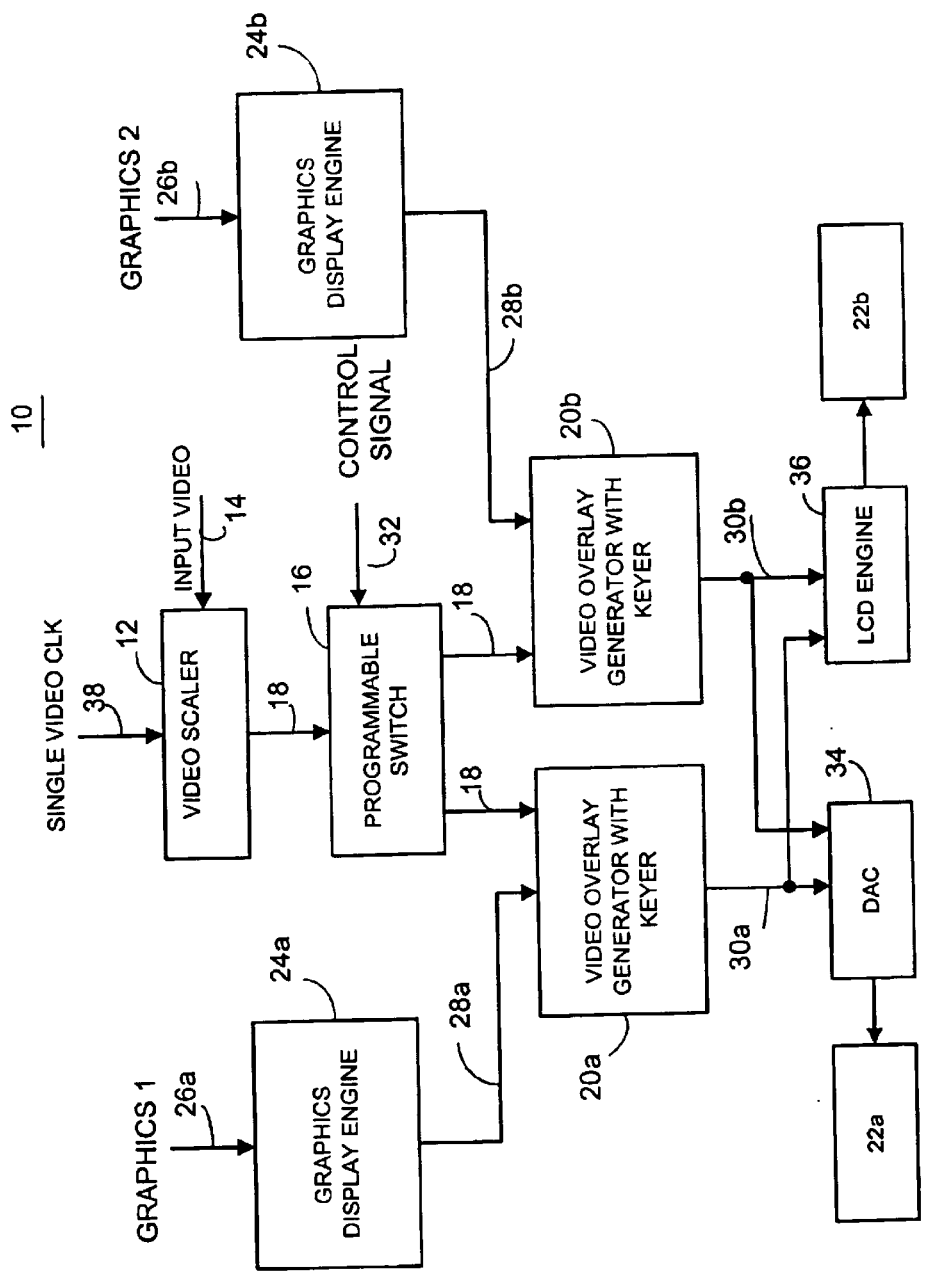
FIG. 1 is a block diagram illustrating one example of a video overlay switching apparatus in accordance with one embodiment of the invention.

FIG. 1 shows a video overlay switching apparatus 10 that includes a common video scaler 12 responsive to input video data 14, and a programmable switching mechanism 16 that is operatively coupled to the video scaler 12 to receive output video 18, such as scaled or unscaled video data. The programmable switching mechanism 16 selectively routes video data 18 to one of a plurality of video overlay generators 20a and 20b to facilitate selective display of overlay data on a selected display device, such as display device 22a (e.g., a television), or alternately, a display device 22b, such as an LCD display. The video overlay switching apparatus 10 may also include a plurality of graphics display engines 24a and 24b, each responsive to respective input graphics data 26a and 26b respectively.

Each of the graphics display engines 24a and 24b output packed graphics data 28a and 28b to respective video overlay generators 20a and 20b. The graphics display engines generate video window-timing data also included as the packed graphics data 28a and 28b for the video overlay generators to determine where the video is to be overlaid and the size of the video to be overlaid. The video overlay generators 28a and 28b each have keyers, which combine or mix the video data 18 along with unpacked graphics data to form overlay information 30a and 30b respectively.

The video overlay switching apparatus 10 may be employed using any suitable programmed processing device, a combination of hardware logic and software, or any other suitable mechanism. The graphics display engines 24a and 24b generate the video window-timing data as known in the art. The video scaler 12 may be any suitable video scaler that performs the requisite scaling operations for the given application.

The programmable switch 16 receives a control signal 32 which may be, for example, any suitable control information such as a bit in a programmable register containing bits for other switching control, or any other suitable control signal. The control signal activates the programmable switch 16 to switch scaled video 18 to either of the two video overlay generators 20a and 20b. The programmable switch also provides other switching as further described below.

Video overlay generators 20a and 20b output the overlay information 30a and 30b to the various display device interfaces, such as digital analog controller (DAC) 34, LCD engine 36, or any other suitable interface or output device. Also, the video scaler. 12 receives a single video clock signal 38, which is determined as a function of the control signal 32 as further described below.

Figure 2:
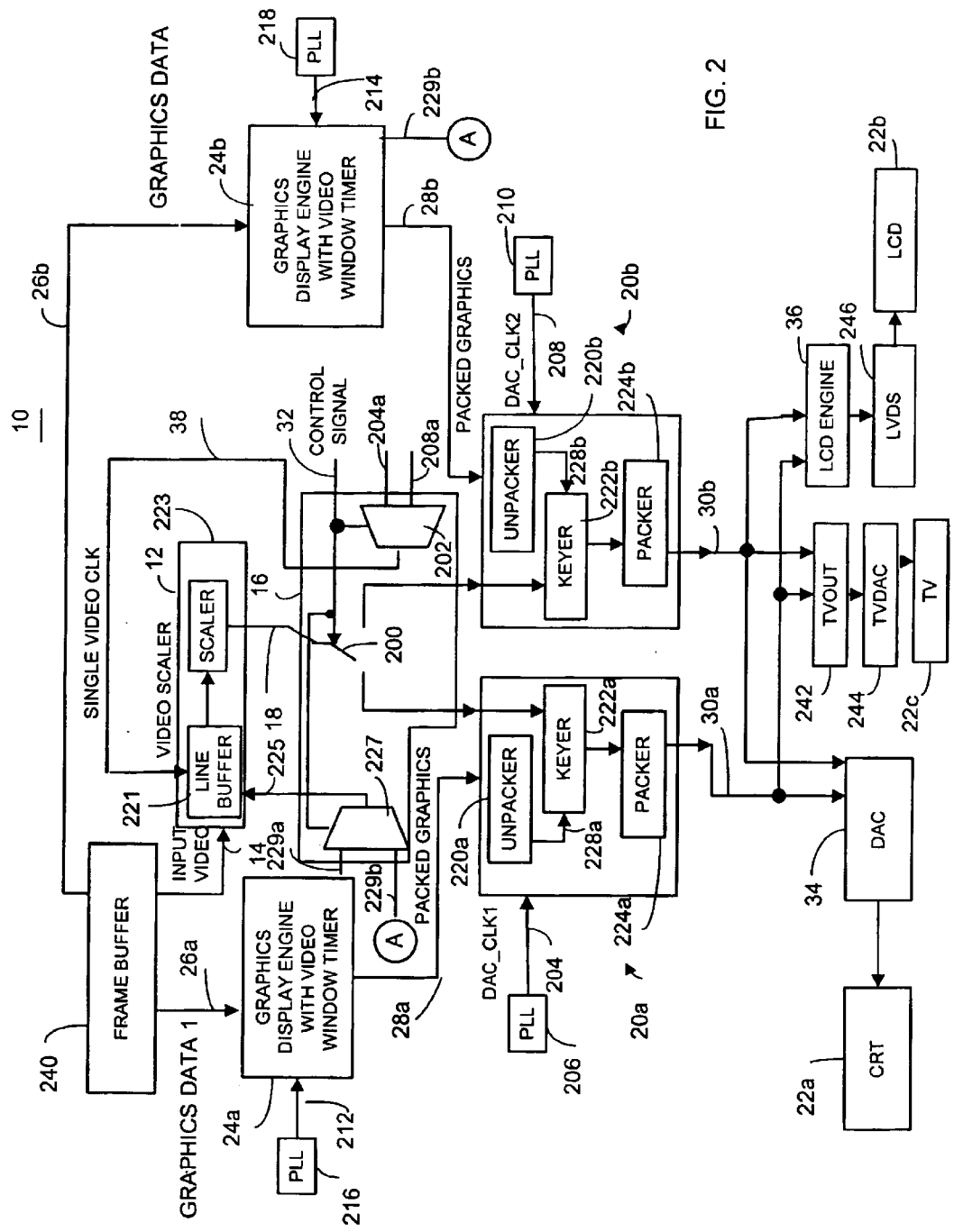
FIG. 2 is a more detailed block diagram of one example of a video overlay switching apparatus in accordance with one embodiment of the invention.

FIG. 2 shows in more detail the video overlay switching apparatus 10 wherein the programmable switch 16 includes a controllable video path switch 200 and a selectable video clock source 202, each controllable by control signal 32. The selectable video clock source 202 may be, for example, a multiplexer that receives a DAC clock signal 204a, such as a derivative of DAC clock signal generator 206. The DAC clock signal generator may be a phase-lock loop circuit (PLL) or any other suitable clock generating mechanism. Also, the selectable video clock source 202 receives a second DAC clock signal 208a that is generated, for example, as a derivative from a video overlay generator clock source 210, such as a separate phase-lock loop circuit, a derivative of the DAC clock signal generator, or any other suitable clock generating circuit.

A display clock signal 212 is received by graphics display engine 24a. Similarly, a display clock signal 214 is received by graphics display engine 24b. The display clock signals 212 and 214 may be derivatives of the DAC clock signals 204 and 208 if desired, or may be generated by separate phase-lock loop circuits 216 and 218.

Each of the video overlay generators includes a graphics data unpacker 220a and 220b, a keyer 222a and 222b, and a data packer 224a and 224b. The unpackers 220a and 220b are operative to unpack packed graphics data 28a and 28b, received from respective display engines 24a and 24b. Each keyer 22a and 22b is operatively coupled to the graphics data unpackers 22a and 22b to receive unpacked graphics information 228a and 228b. Each of the keyers 22a and 22b is also responsive to selectively routed video data 18 from the programmable switching mechanism 16. As such, each keyer, 22a and 22b, suitably determines, based on the packed graphics information, the video window for which the selectively routed video data 18 is to be positioned within a display screen as known in the art. Data packers 24a and 24b received the keyed graphics and video information and pack the combined video and graphics information to generate the overlay information 30a and 30b as known in the art.

The selectable video clock source 202 is coupled to the common video scaler 12 by providing the single video clock signal 38. The video scaler 12 scales input video 14 corresponding to a display engine 24a or 24b by providing scaled video to the programmable switch 16 which then switches the video to the appropriate video overlay generator 20a or 20b, depending upon the control signal 32. The common (e.g., single) video scaler includes line buffer 221 and video scaler 223. The video scaler 223 receives the video data from line buffer 221 and window timing control signal 225 while line buffer 221 receives the single video clock signal 38. The stored lines of video data are then scaled by the scaler 223 as known in the art. As such, the video scaler scales the video in response to the video clock signal output 38 such that the timing of the video information and scaling is dependent on whether the video is selected to be mixed through video overlay generator 20a or video overlay generator 20b.

The programmable switching mechanism 16 also facilitates programming of frame buffer 240 by programming frame buffer space for each display engine 24a and 24b, based on which video overlay generator 20a or 20b has been selected to receive input video. For example, the frame buffer 240 has buffer space dedicated to each display device and space dedicated for video data. Based on register data indicating which display device has been selected by a user for display of the overlay information, the system stores keyer information with the graphics data in the corresponding graphics frame buffer space. The keyer information may be in the form of a single color so that a block of single color data stored in the frame buffer represents the size of the video overlay. This data is included as graphics data 26a and 26b and subsequently translated to video window timing data. However, only one of the dedicated graphic frame buffer spaces includes the keyer data at any one time since the switching mechanism alternates video between multiple paths.

The selectable video clock source 202 includes a multiplexer which serves as a programmable switch to provide switching between a plurality of display-dependent clock signals 204 and 208. These signals are display-dependant since they may vary depending upon which display is selected to display the overlaid video. For example, if a selected display has a higher refresh rate than another display, the clock signal 204 and 208 may be different, and as such the single video clock signal 38 is switched to be equal to one of the differing clocks 204 and 208.

In addition, the programmable switching mechanism 16 may also include video scaler control signal switch 227, such as a multiplexer, that receives a plurality of video scaler control signals 229a and 229b from the graphics display engines with the video window timers 24a and 24b. The video scaler control signal switch 227 outputs one of the two control signals 229a and 229b based on which path the video is to be sent. The control signals 229a and 229b include data that represent, for example, when the video scaler is to start and stop based on the window timing data.

The video overlay switching apparatus 10 also includes a software user interface such as a graphic user interface (GUI), which generates the control signal 32. For example, a user may select which display device 22a–22c a user desires to display the overlaid video on and selects the control signal to provide the video processing path to the appropriate video overlay generator 20a or 20b to facilitate selective overlay display. This may be done on a per application basis. As such, the user interface may prompt the user each time an application is started, for example.

Each of the graphics display engines include video window-timers as known in the art, which provide video window-timing data such as data representing the size of the video window and its location within a viewing area on a display device so that the video overlay generator may overlay, through the keyer, the appropriate video data and graphic information. It will be recognized that any of the blocks shown herein may be incorporated in any of the other blocks if desired. For example, the unpacker may be incorporated as part of the graphics display engine and the video window-timer may be incorporated, for example, as part of the video overlay generator. Each of the graphics display engines receives a graphics data 26a or 26b along with register settings indicating window timing.

Where a television is the output display device, a TV out circuit 242 and a TV digital analog converter (DAC) 244 may also be used to suitably process the overlay information 30a or 30b to the appropriate signal levels to be displayed on TV 22c. Similarly, and LVDS circuit 246 may also be used when displaying data on an LCD display 22b as known in the art.

FIG. 3a illustrates, by way of example, the operation of the system shown in FIGS. 1 and 2. As shown in block 300, the system programs through a software driver, the frame buffer 240, based on which overlay generator has been selected to receive input video. This is done by analyzing the control signal register bits to determine which display engine has been selected. As shown in block 301, the apparatus receives the input video through the common video scaler. As shown in block 302, the common video scaler scales the input video. As shown in block 304, the system provides first video window-timing data, for example, to the graphics overlay generator 20a and provides second video window-timing data to the video overlay generator 20b. As shown in block 306, the programmable switching mechanism selectively routes the video data that has been scaled, from the common video scaler alternately to one of a plurality of overlay generators. As shown in block 310, the overlay video generator generates first video overlay based on the selectively routed input data 18 for a selective display 22a–22c. This is done based on the control signal 32. As shown in FIG. 2, the switching mechanism 16 switches the common video input data alternately to one of two paths. It will be recognized, however, that any suitable number of paths may be switched depending upon the number of corresponding graphics display engines and video overlay generators.

As shown in block 312, the system alternately generates second video overlay data 30b based on selectively routed input video for a selected display. Blocks 316–320 may be repeated to generate the second video display.

FIG. 3b shows in more detail the steps performed in block 310 of FIG. 3a. As shown in block 316, to generate a video overlay, the system unpacks graphics data received from a respective display engine. As shown in block 318, a keyer keys the graphics data from respective display engines and the selectively routed video data that was obtained through the programmable switch. As shown in block 320, the system then packs the combined video and graphics data, for each video graphics overlay and then outputs the overlaid information to the appropriate display interface.

As evident from the above, the system employs a single video scaler and multiple video overlay generators where each of the overlay generators includes a keyer. The system allows alternate display of overlaid video on a plurality of display devices to facilitate a cost-effective video overlay presentation system.

It should be understood that the implementation of other variations and modifications of the invention in its various aspects will be apparent to those of ordinary skill in the art, and that the invention is not limited by the specific embodiments described or the order in which the methods are preformed. It is therefore contemplated to cover by the present invention, any and all modifications, variations, or equivalents that fall within the spirit and scope of the basic underlying principles disclosed and claimed herein.

What is claimed is:

1. A video overlay apparatus comprising:
   a video scaler operatively responsive to input video data; and
   a programmable switching mechanism, operatively coupled to the video scaler, to programmably switch video data from the video scaler into one of at least first and second video overlay generators that are each capable of being operably coupled to at least corresponding first and second display devices, in order to enable the display of said video data from said video scaler and overlay data from one of said first and second overlay generators on one of at least a first output display device and a second display device.

2. The video overlay device of claim 1 wherein the programmable switching mechanism includes a programmable register.

3. The video overlay device of claim 1 including:
   a first display engine responsive to first graphics data for generating first video window timing data,
   a second display engine responsive to second graphics data for generating second video window timing data,
   a first video overlay generator operatively responsive to first graphics data; and
   a second video overlay generator operatively responsive to the second graphics data.

4. The video overlay device of claim 3 wherein each of the first and second video overlay generators includes:
   a graphics data unpacker operative to unpack graphics data received from a respective display engine;
   a keyer operatively coupled to the graphics data unpacker and responsive to the selectively routed video data from the programmable switching mechanism; and
   a data packer operatively coupled to the keyer to pack combined video and graphics data from the keyer.

5. The video overlay device of claim 1 wherein the programmable switching mechanism includes a selectable video clock source operatively coupled to the video scaler wherein the video scaler scales input video corresponding to a display engine for at least one of the plurality of video overlay generators in response to a video clock signal output from the selectable video clock source.

6. The video overlay device of claim 3 wherein the programmable switching mechanism further facilitates programming of frame buffer space for each display engine based on which video overlay generator has been selected to receive input video.

7. The video overlay device of claim 5 wherein the selectable video clock source includes a programmable switch to facilitate switching between a plurality of display dependent clock signals that are selectively coupled to a common video scaler line buffer.

8. The video overlay device of claim 1 including a user interface operable to control the programmable switching mechanism to facilitate selective overlay display on a per application basis.

9. A video overlay apparatus comprising:
a video scaler operatively responsive to input video data;
a first display engine responsive to first graphics data for generating first video window timing data,
a second display engine responsive to second graphics data for generating second video window timing data,
a first video overlay generator operatively responsive to first graphics data;
a second video overlay generator operatively responsive to the second graphics data; and
a programmable switch, operatively coupled to the video scaler and to at least said first video overlay generator and said second video overlay generator, to programmably switch video data from the video scaler to at least one of: said first video overlay generator and said second video overlay generator in order to enable the selective display of said video data from said video scaler and overlay data on each one of: at least a first display device and a second display device, wherein each of the video overlay generators is capable of being operably coupled to at least corresponding first and second display devices and each of the video overly generators outputs overlay information for a corresponding display device and wherein the programmable switching mechanism includes a selectable video clock source operatively coupled to the video scaler wherein the video scaler scales input video corresponding to a display engine for at least one of the plurality of video overlay generators in response to a video clock signal output from the selectable video clock source.

10. The video overlay device of claim 9 wherein the programmable switching mechanism includes a programmable register.

11. The video overlay device of claim 9 wherein each of the first and second video overlay generators includes:
a graphics data unpacker operative to unpack graphics data received from a respective display engine;
a keyer operatively coupled to the graphics data unpacker and responsive to the selectively route video data from the programmable switching mechanism; and
a data packer operatively coupled to the keyer to pack combined video and graphics data from the keyer.

12. The video overlay device of claim 11 wherein the programmable switching mechanism further facilitates programming of frame buffer space for each display engine based on which video overlay generator has been selected to receive input video.

13. The video overlay device of claim 9 wherein the selectable video clock source includes a programmable switch to facilitate switching between a plurality of display dependent clock signals.

14. The video overlay device of claim 9 including a user interface operable to control the programmable switching mechanism to facilitate selective overlay display on a per application basis.

15. A video overlay method comprising the steps of:
scaling input video through a common video scaler for delivery to one of a plurality of video overlay generators, each of said video overlay generators having an output for coupling video and video overly data into each of a plurality of display devices; and
selectively switching video data from the common video scaler to one of the plurality of video overlay generators to facilitate selective display of overlay data and video on each one of a plurality of display devices coupled to an output of a video overlay generator such that each of the video overlay generators outputs overlay information to each one of a plurality of display devices.

16. The video overlay method of claim 15 including controlling the selective routing of video data using a programmable switching mechanism that includes a programmable register.

17. The video overlay method of claim 15 including:
providing first video window timing data from a first display engine responsive to first graphics data,
providing second video window timing data from a second display engine responsive to second graphics data,
generating a first video overlay based on first graphics data and at least a portion of selectively routed input video data; and
generating a second video overlay based on second graphics data and at least a portion of selectively routed input video data.

18. The video overlay method of claim 17 including:
unpacking graphics data received from a respective display engine;
keying video and graphics data from a respective display engine and the selectively routed video data selectively routed by a programmable switching mechanism; and
packing combined video and graphics data for each respective video graphic overlay generator for alternate output to the display.

19. The video overlay method of claim 18 wherein the programmable switching mechanism includes a selectable video clock source operatively coupled to the video scaler wherein the video scaler scales input video corresponding to a display engine for at least one of the plurality of video overlay generators in response to a video clock signal output from the selectable video clock source.

20. The video overlay method of claim 15 including the step of programming of frame buffer space for each display engine based on which video overlay generator has been selected to receive input video.

21. The video overlay method of claim 19 wherein the selectable video clock source includes a programmable switch to facilitate switching between a plurality of display dependent clock signals.

22. The video overlay method of claim 15 including providing a user interface operable to control a programmable switching mechanism to facilitate selective overlay display on a per application basis.

* * * * *